United States Patent
Kumar et al.

(10) Patent No.: US 6,434,367 B1
(45) Date of Patent: Aug. 13, 2002

(54) USING DECOUPLED POWER CONTROL SUB-CHANNEL TO CONTROL REVERSE-LINK CHANNEL POWER

(75) Inventors: Sarath Kumar, Eatontown; Quinn Li, Madison; Xiao C. Wu, Parsippany, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/330,888

(22) Filed: Jun. 11, 1999

(51) Int. Cl.⁷ .............................. H04B 1/00
(52) U.S. Cl. .............. 455/70; 455/436; 455/437; 455/522; 370/331; 370/332
(58) Field of Search .................. 455/702, 403, 455/414, 417, 434, 436, 437, 13.4, 515, 522; 370/331, 332, 333, 335, 342

(56) References Cited

U.S. PATENT DOCUMENTS

| | | | |
|---|---|---|---|
| 5,268,933 A | | 12/1993 | Nimrod |
| 5,305,308 A | | 4/1994 | English et al. |
| 5,673,031 A | | 9/1997 | Meier |
| 5,799,010 A | | 8/1998 | Lomp et al. |
| 5,896,411 A | * | 4/1999 | Ali et al. ............ 375/200 |
| 6,069,883 A | * | 5/2000 | Ejzak et al. .......... 370/335 |
| 6,154,659 A | * | 11/2000 | Jalali et al. .......... 455/522 |
| 6,163,707 A | * | 12/2000 | Miller ................. 455/522 |
| 6,216,019 B1 | * | 4/2001 | Gibbons et al. ....... 455/574 |
| 6,304,562 B1 | * | 10/2001 | Kim et al. ........... 370/322 |

FOREIGN PATENT DOCUMENTS

| | | |
|---|---|---|
| EP | 0 777 396 A | 6/1997 |
| EP | 0 845 877 A2 | 6/1998 |
| EP | 0 884 918 A | 12/1998 |
| EP | 0 891 114 A | 1/1999 |
| WO | WO 98 42108 A | 9/1998 |
| WO | WO 98 47302 A | 10/1998 |
| WO | WO 99/09660 | 2/1999 |
| WO | WO 99 09660 A | 2/1999 |

* cited by examiner

Primary Examiner—William Trost
Assistant Examiner—Congvan Tran
(74) Attorney, Agent, or Firm—Mendelsohn & Associates PC (57) ABSTRACT

In a wireless communications system, a base station transmits power control signals (e.g., the power control bits of a power control sub-channel) to a mobile using a forward-link channel that is decoupled from all other signals transmitted from that base station to that mobile. For example, the decoupled forward-link channel may be a common power control channel. The mobile then uses the power control signals received in the decoupled forward-link channel to control its power level for transmitting one or more reverse-link channels to the base station. The ability of base stations to use decoupled forward-link channels in order to transmit their power control signals to a mobile enables a mobile to operate with different active sets for the forward and reverse links. This enables forward-link data traffic to be implemented using a simplex mode, even when the mobile is operating in soft handoff in the reverse link. This in turn greatly reduces the reactivation time involved in transitioning a mobile from the suspended state to the active state, which is particularly desirable for bursty (i.e., intermittent) packet data flow, as opposed to continuous circuit-oriented voice messaging.

22 Claims, 6 Drawing Sheets

USING DECOUPLED POWER CONTROL SUB-CHANNEL TO CONTROL REVERSE-LINK CHANNEL POWER

BACKGROUND OF THE INVENTION

1. Field of the Invention

The present invention relates to telecommunications, and, in particular, to wireless communications systems conforming to a code-division, multiple-access (CDMA) standard, such as the cdma2000 standard of the IS-95 family of CDMA wireless standards.

2. Cross-Reference to Related Aapplications

This application is one of a set of U.S. patent applications consisting of Ser. Nos. 09/330,888, 09/330,582, 09/332,274 and Ser. No. 09/330,506 all of which were filed on the same date and the teachings of all of which are incorporated herein by reference.

3. Description of the Related Art

Figure 1:
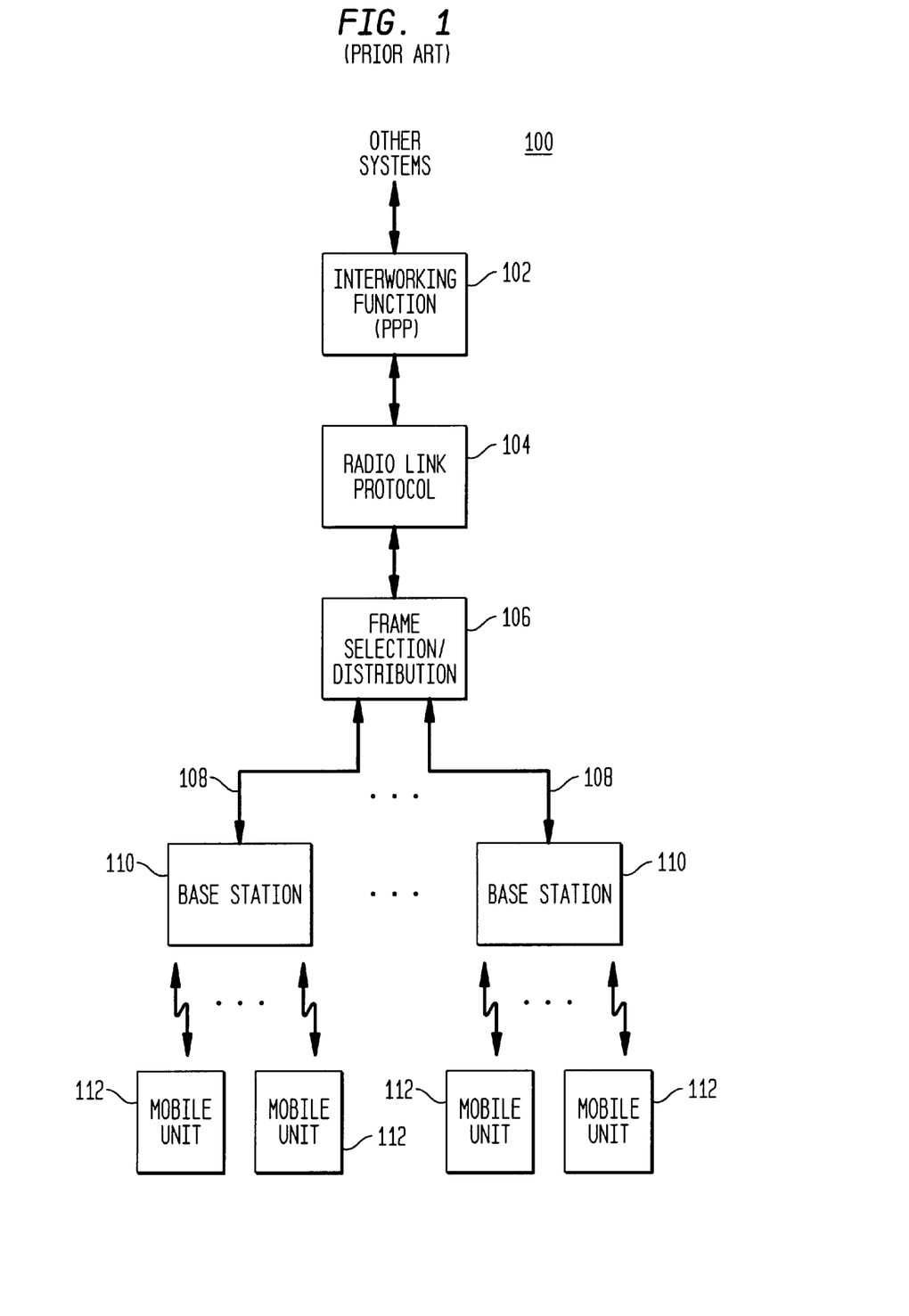
FIG. 1 shows a block diagram of a conventional CDMA wireless communications system.

FIG. 1 shows a block diagram of a conventional CDMA wireless communications system 100. Communications system 100 is assumed to conform to the cdma2000 standard in the IS-95 family of CDMA wireless standards, although the present invention is not necessarily so limited. Communications system 100. comprises an interworking function (IWF) 102 connected to a radio link protocol (RLP) function 104, which is in turn connected to a frame selection/distribution (FSD) function 106, which is in turn connected to one or more base stations 110 via back haul facilities 108 (e.g., T1 lines). Depending on the specific implementation, IWF function 102, RLP function 104, and FSD function 106 may be, but need not be, physically separate functions.

Each base station 110 is capable of simultaneously supporting wireless communications with one or more mobile units 112. FSD function 106 performs a forward-link frame distribution function in which frames of data corresponding to user messages are distributed to the various base stations. In addition, FSD function 106 performs a reverse-link frame selection function in which frames of data received from the various base stations are processed for forwarding on to RLP function 104. In the forward-link direction, RLP function 104 segments user messages received from IWF function 102 into frames of data for distribution by FSD function 106. In the reverse-link direction, RLP function 104 reassembles packets of data received from FSD function 106 into user messages for forwarding on to IWF function 102. IWF function 102 implements a high-level point-to-point protocol (PPP) to perform certain centralized functions for communications system 100 to coordinate and control operations at the various base stations 110. IWF function 102 also functions as the interface between communications system 100 and other communications systems (not shown) to provide a full range of telecommunications services to the mobile units, including voice communications with a remote end unit and/or data communications with a computer server or other nodes of a computer network.

As used in this specification, the term "mobile unit" as well as its synonyms "mobile user," "mobile," and "user," will all be understood to refer to any end node communicating via wireless transmissions with one or more base stations of a wireless communications system, whether that end node is actually mobile or stationary. Also, as used in this specification, the term "base station" is synonymous with the terms "call leg" (or "leg" for short) and "cell site" (or "cell" for short).

The cdma2000 standard supports different modes of data communications. For relatively low rates of data messaging, a fundamental channel (FCH) can handle both signaling and data messaging. Signaling refers to the communications between a mobile and a base station that are used by the mobile and the base station to control the communications links between them, while messaging refers to the information passed through the base station to and from the end nodes of those communications, where the mobile is one of those end nodes. For high-rate data messaging, a supplemental channel (SCH) can be used for data messaging, while the fundamental channel handles the signaling between the mobile and the base station. Alternatively, when an SCH is used for data messaging, the signaling between the mobile and the base station can be handled by a special communications channel called a dedicated control channel (DCCH), which requires less power to transmit than an FCH, which is designed to handle low-rate data messaging in addition to signaling.

Figure 2:
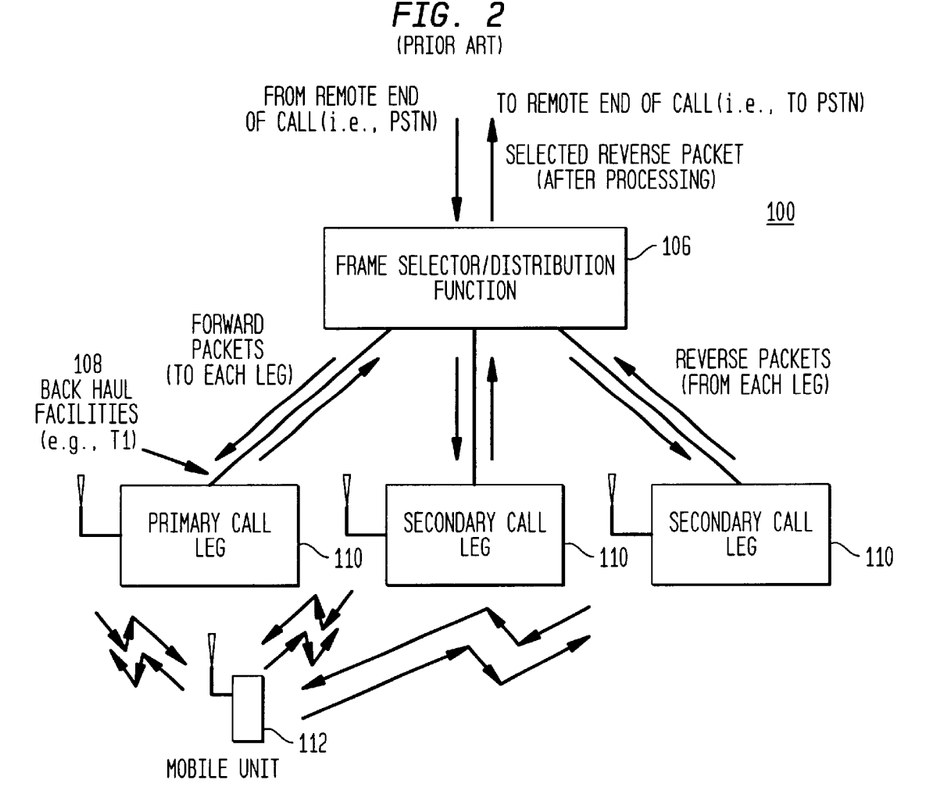
FIG. 2 shows a functional block diagram of a portion of the communications system of FIG. 1 for a mobile unit operating in soft handoff with three base stations.

FIG. 2 shows a functional block diagram of a portion of communications system 100 of FIG. 1 for a mobile unit 112 operating in soft handoff with three base stations 110. Soft handoff refers to a situation in which a mobile unit is simultaneously communicating with two or more base stations, each of which is referred to as a call leg of those communications. Frame selection/distribution function 106 supports the soft handoff communications between mobile unit 112 and the three base stations 110.

During normal voice communications, mobile 112 transmits voice messages using a reverse-link fundamental channel. Each of the three base stations 110 in soft handoff with mobile 112 receives the reverse-link FCH, accumulates voice messages into reverse-link packets, and transmits the reverse-link packets over back haul 108 to FSD function 106. FSD function 106 receives the reverse-link packets from all three base stations, identifies sets of corresponding reverse-link packets (one reverse-link packet from each base station corresponding to the same voice messages received from the mobile), and selects one reverse-link packet from each set of corresponding reverse-link packets to transmit to the rest of the wireless system for eventual transmission to the remote end of the call (e.g., a connection with a regular PSTN user or possibly another mobile unit in communications system 100).

At the same time, FSD function 106 receives forward-link packets containing voice messages from the remote end of the call intended for mobile unit 112. FSD function 106 distributes copies of each forward-link packet to all of the base stations currently in soft handoff with the mobile. Each base station transmits the forward-link packets to mobile unit 112 using a different forward-link fundamental channel. Mobile unit 112 receives all three forward-link FCHs and combines corresponding voice messages from all three forward-link FCHs to generate the audio for the person using mobile unit 112.

The timing of the distribution of the copies of the forward-link packets from FSD function 106 to the three base stations is critical, because mobile unit 112 needs to receive each set of corresponding voice messages from all three forward-link signals within a relatively short period of time in order to be able to combine all of the corresponding voice messages together. Similarly, FSD function 106 needs to receive all of the corresponding reverse-link packets from the different base stations within a relatively short period of time in order to coordinate the selection of packets for further processing.

In order to satisfy these forward-link and reverse-link timing requirements, whenever a new call leg is added at a base station (i.e., whenever a new base station begins communications with a particular mobile unit in soft handoff), special synchronization procedures are performed between the base station and FSD function 106, e.g., in order to ensure proper synchronization of that base station's forward-link transmissions with the forward-link transmissions from the other base stations currently participating in soft handoff with the mobile. These synchronization procedures involve specific communications back and forth between the base station and the FSD function over the back haul.

Although a fundamental channel can support some modest amount of data messaging in addition to voice messaging, the cdma2000 standard also supports high-speed data messaging via supplemental channels. According to the cdma2000 standard, since data messaging is typically bursty (i.e., intermittent), as opposed to the continuousness of voice messaging, supplemental channels are established and maintained only for the duration of each data burst. During a burst of data messaging via an assigned SCH, the mobile unit is said to be in an active state. Between bursts of data messaging when no SCH is currently assigned, but when an FCH (or DCCH) is assigned, the mobile unit is said to be in a control hold state. When no dedicated air interface channels are assigned, the mobile unit is said to be in a suspended state.

Analogous to the use of a fundamental channel for voice and/or low-speed data messaging, high-speed reverse-link data messages are transmitted by mobile unit 112 using a reverse-link supplemental channel. Each base station currently operating in soft handoff with the mobile unit receives the reverse-link SCH and generates reverse-link packets of data messages for transmission to FSD function 106 via the back haul. FSD function 106 receives the reverse-link packets from all of the base stations and selects appropriate reverse-link packets for transmission to the remote end of the call (which, in the case of data messaging, may be a computer server).

Similarly, FSD function 106 receives forward-link packets of data messages intended for mobile unit 112 and coordinates the distribution of those forward-link packets via the back haul to the appropriate base stations for coordinated transmission to the mobile via assigned forward-link supplemental channels. In addition to the synchronization processing between each base station and FSD function 106 required to meet the timing requirements for receiving messages at the mobile, in data communications, the base stations need to coordinate their operations to ensure that they all transmit their forward-link SCHs to the mobile at the same data rate. This requires the base stations to communicate with one another via the back haul whenever a new burst of forward-link data is to be transmitted to the mobile unit requiring new SCHs to be assigned.

The reactivation time is the time that it takes to change the status of a mobile unit from either the suspended state or the control hold state to the active state in which a high-data-rate air interface channel is assigned. In the suspended state, no dedicated air interface channel is assigned to the mobile unit. In the control hold state, the mobile unit is assigned only a dedicated power control and signaling channel. In prior-art IS-95 CDMA systems, the reactivation time includes the time required to assign a new channel to the mobile and the time required to synchronize each base station with the frame selection/distribution function. When the new channel is a supplemental channel to be used for data transmission to a mobile unit in soft handoff, the reactivation time also includes the time required for the different base stations to coordinate their forward-link transmission data rates. In general, the longer the reactivation time, the lower the data throughput of the wireless system. As such, it is desired to keep reactivation time as low as practicable.

The back-end architecture, also referred to as the back haul, for prior-art IS-95 CDMA wireless systems is based on providing voice service in a wireless environment that supports soft handoff (SHO) on both forward and reverse links. Voice service is implemented using a vocoding function that is provided, for example, in the centralized location of the mobile switching center (MSC), and these resources need to be assigned and freed as calls are set up and cleared. The prior-art voice-oriented back haul is also used to provide circuit-switched data service and has also been applied to packet data service. The rationale for using the existing voice-oriented back haul for packet data service is to save on development cost and time, because much of the existing structure and operation can be reused. The penalty, though, is to force larger-than-necessary delays on the packet service because of the many set up, clearing, and synchronization operations that are carried through to the packet service, which result in large reactivation times during packet data service.

Problems with Using Existing Back Haul Architectures for Packet Data Service

The following problems occur when the existing circuit-oriented techniques for back haul transport are used to support packet data, rather than the voice and circuit-mode data applications they are designed to handle.

1. When a mobile call is initially set up, a frame selection/distribution function is chosen by the wireless system software to service the call, and an initialization and synchronization procedure occurs between the FSD function and the base station serving the call. The synchronization procedure involves exchanging null (no information) packets between the FSD function and the (primary) cell for a number of 20-millisecond intervals, until synchronization is achieved. Timing adjustment messages may need to be exchanged between the primary cell and the FSD function before synchronization can be achieved.

These procedures add unnecessary delay when applied to a packet data call. Packet data calls are generally more tolerant to transmission delays than are voice or circuit-mode data calls. If the circuit-oriented itialization procedure is applied to a packet data call, an extra delay is added to the time it would otherwise take to bring the user from a suspended state, in which no air interface channels are assigned to the user, to an active state, in which at least one air interface channel is assigned, and the mobile user can begin sending user messages to the FSD function.

2. When secondary legs are added to a call, interactions between the secondary cells and the FSD function need to occur before user messages can be transferred from a secondary leg to the FSD function. Hence, these circuit-oriented procedures on the back haul add delay when legs are added to a call.

3. FSD function transmissions to the cell are synchronized to the 20-millisecond boundaries of the air interface transmissions. This arrangement, among other things, avoids contention and delay at the cells, and saves on the memory that would otherwise be needed to buffer user messages before their transmission over the air interface. User messages arrive at the cell at just about the time they need to be transmitted over the air interface. Such synchronization is required for voice calls, but might not be required for data calls, unless the forward link of the data call has multiple call legs, in which case, synchronization is required, since all legs must transmit a given user message over the air interface at precisely the same time instant. Also, like all circuit-oriented procedures, when used to transport packet data having bursty arrival statistics, back haul bandwidth is wasted.

4. The radio link protocol as currently defined in standards (e.g., Interim Standard IS-707) performs the function of ensuring reliable exchange of user messages between the network and the mobile unit. It has provisions to retransmit data received in error, or data missed by the receiver, and also to discard duplicate received messages. Prior art for this protocol is to have the network-based end of the RLP function coordinate its transmission of information to the base station with the rate and format used to transmit user messages over the air. For circuit-mode data, this arrangement works well, because the rate and format are determined when the call is established, and do not change during the call. However, for a high data rate packet mode data service, the scarce air interface resource is assigned only when there is data to exchange with the mobile user. The air interface channels are allocated and de-allocated as needed by the various packet data users. Hence, prior art demands that the network-based RLP function coordinate its transmission of data with the base stations prior to sending data to the base stations. This coordination means that delay is added between the time user data arrives at the RLP function and the time the data is sent to the base stations for transmission over the air to the user. Furthermore, if a packet data user is inactive for a relatively long period of time (a parameter fixed by each vendor, but could be on the order of 30 seconds), prior art would have the RLP functionality disconnect from the mobile user. Hence, when data again needs to be exchanged with the mobile user, an additional time delay is incurred to re-initialize the mobile unit with the RLP function.

These enumerated problems point out that applying the circuit mode back haul procedures of the prior art to a high-speed packet data (HSPD) service causes substantial delays to the high-speed packet data service. It is therefore desirable to design a back haul architecture that (a) is optimized for packet data service and (b) minimizes the reactivation time of users due to back haul procedures.

Power Control

According to the cdma2000 standard, each base station 110 monitors the receive power level of the reverse-link channel signals transmitted by mobile unit 112. Each different forward-link FCH (or forward-link DCCH) transmitted from each base station to the mobile contains a periodically repeated power control (PC) bit that indicates whether that base station believes the mobile should increase or decrease the transmit power level of its reverse-link channel signals. If the current PC bits in a forward-link FCH indicate that the mobile should decrease its transmit power level, the mobile will decrease its transmit power level, even if the current PC bits in all of the other forward-link FCHs from the other legs of the soft handoff indicate that the mobile should increase its power level. Only when the current PC bits in the forward-link FCHs from all of the legs indicate that the mobile should increase its transmit power level will the mobile do so. This power control technique enables the mobile to transmit at a minimal acceptable power level in order to maintain communications while efficiently using the possibly limited power available at the mobile and reducing the possibility of interference at the base stations with reverse-link signals transmitted from other mobile units.

Figure 3:
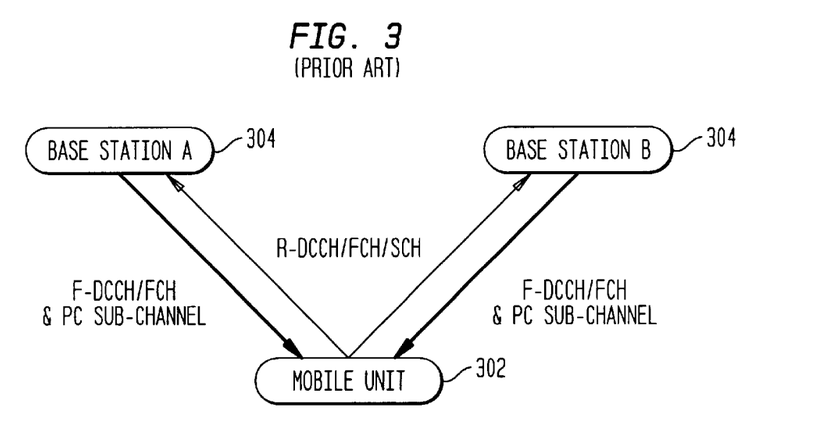
FIG. 3 shows a mobile unit in soft handoff with two base stations during conventional reverse-link data transmissions from the mobile unit.

FIG. 3 shows a mobile unit 302 in soft handoff with two base stations 304 during conventional reverse-link data transmissions from the mobile unit. According to the prior-art IS-95 standards, a symmetric active set must be maintained by the forward and reverse links. In other words, the set of base stations currently participating in soft handoff with a particular mobile unit in the forward-link direction must be identical to the set of base stations currently participating in soft handoff with that same mobile unit in the reverse-link direction.

The soft handoff situation shown in FIG. 3 satisfies this requirement. In particular, in the forward link, each base station 304 simultaneously transmits in the forward-link direction using either a forward dedicated control channel (F-DCCH) or a forward fundamental channel (F-FCH). At the same time, mobile unit 302 transmits in the reverse-link direction using a reverse DCCH, a reverse FCH, and/or a reverse supplemental channel, and those reverse-link signals are simultaneously received and processed in parallel at both base stations. Thus, the active set for the forward link (i.e., base stations A and B) is identical to the active set for the reverse link. During the active state, each base station generates power control bits constituting a power control sub-channel that is multiplexed (i.e., punctured) either on the corresponding F-DCCH or on the corresponding F-FCH, depending on which channel is present.

SUMMARY OF THE INVENTION

The present invention is directed to a technique for transmitting power control signals from a base station to a mobile, where the mobile uses those power control signals to control the transmit power level of its reverse-link channels. For cdma2000 systems, the PC bits of the power control sub-channel are transmitted using the common power control channel, which is decoupled from any other forward-link signals transmitted from that base station to that mobile. The ability of base stations to use decoupled forward-link channels in order to transmit their power control signals to a mobile enables a mobile to operate with different active sets for the forward and reverse links. This enables forward-link data traffic to be implemented using a simplex mode, even when the mobile is operating in soft handoff in the reverse link. This in turn greatly reduces the reactivation time involved in transitioning a mobile from either the suspended state or the control hold state to the active state, which is particularly desirable for bursty (i.e., intermittent) packet data flow, as opposed to continuous circuit-oriented voice messaging.

In one embodiment, the present invention is a wireless communications method, comprising the steps of (a) beginning to receive, at a first base station of a wireless communications system, one or more reverse-link channels; and (b) then transmitting corresponding forward-link power control signals corresponding to a power control sub-channel, by the first base station, using a decoupled forward-link channel that is decoupled from any other forward-link transmission by the first base station.

In another embodiment, the present invention is a wireless communications system comprising a first base station configured to (a) begin to receive and process one or more reverse-link channels; and (b) then transmit corresponding forward-link power control signals corresponding to a power control sub-channel using a decoupled forward-link channel that is decoupled from any other forward-link transmission transmitted by the first base station.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Communications systems of the present invention implement a wireless packet data approach that achieves low reactivation times when a supplemental channel is set up on a call to send a burst of packet data. According to this approach, when a mobile unit is otherwise operating in soft handoff, a forward supplemental channel (F-SCH) is not set up with multiple soft handoff legs for forward-link transmissions, but rather uses a single leg to perform the high-speed forward-link transmissions of user data in simplex mode. For reverse-link soft handoff transmissions, the user data is carried by a reverse SCH (R-SCH) on each of multiple legs to a frame selection/distribution (FSD) function. This approach defines a single FSD function to handle both the signaling and the SCH data packets and also defines packet-oriented semantics for its connection to the call legs. According to this approach, the power control information, previously specified by CDMA wireless standards like IS-95 B/C to be carried on a forward-link signaling channel (i.e., either an F-FCH or an F-DCCH), is instead carried on the common power control channel (PCCH) that is shared with other mobiles.

The present approach addresses the problems described earlier related to using the voice-oriented back haul architectures of prior-art IS-95 wireless communications systems to support packet data service. Communications systems according to the present invention support soft handoff only on the reverse link and not on forward link. Note that softer handoff (i.e., between different sectors of the same cell site) is allowed on the forward link, since softer handoff is implemented independently at individual base stations. Communications systems of the present invention use a connection-less back haul with a centralized FSD function, where the conventional RLP function in the forward direction is divided into two pieces and distributed between the FSD function and the medium access control (MAC) function in the base station. In particular, the conventional RLP retransmission function is handled at the FSD function, while the physical layer framing and resegmentation, CRC (error detection and correction), channel encoding, multiplexing of multiple streams, and any encryption functions, as well as scheduling and determination of transmission rate, are all handled at the base station MAC function.

Figure 4:
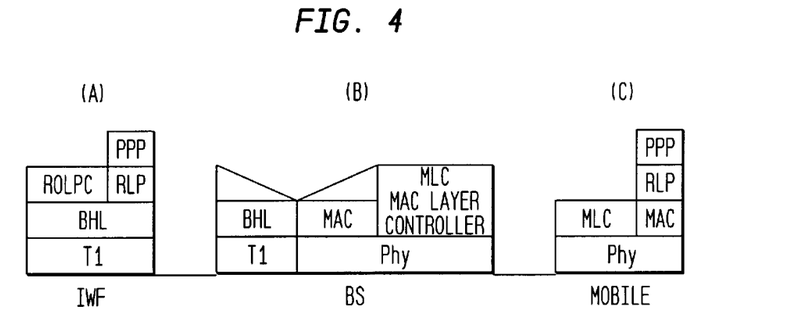
FIGS. 4A–C show representations of the protocol stacks for (A) a frame selection/distribution function, a radio link protocol function, and an interworking function, (B) a base station, and (C) a mobile unit, respectively, for a wireless communications system in accordance with the present invention.

FIGS. 4A–C show representations of the protocol stacks for (A) an FSD function, an RLP function, and an IWF function, (B) a base station, and (C) a mobile unit, respectively, for a wireless communications system in accordance with the present invention. A protocol stack provides a representation of the hierarchy of functions implemented at particular system component. FIGS. 4A–C show the following protocols:

T1 represents the protocol that controls the modulation/demodulation, encoding/decoding, and transmission/receipt of signals over the physical connection (e.g., a hardwired T1 link) between the FSD function and the base station.

Phy represents the protocol that controls the modulation/demodulation, encoding/decoding, and transmission/receipt of signals over the physical connection (i.e., the air link) between the base station and the mobile.

BHL represents the back haul link, the protocol that directly controls the transmission of user information over the T1 link.

Similarly, MAC and MLC represent, respectively, the medium access control function and the MAC layer controller, which collectively and directly control the Phy protocol. In particular, the MAC function controls the physical layer framing and resegmentation, while the MLC controls scheduling and MAC messaging.

ROLPC represents the reverse outer-loop power control function. Each base station generates quality-of-service (QoS) data based on the quality of reverse-link signals received from the mobile unit. The ROLPC function processes that QoS data to establish a set point that is communicated to and used by the base stations when they perform the RILPC (reverse inner-loop power control) function to generate the power control bits for transmission to the mobile.

RLP represents the forward-link and reverse-link user message retransmission function, which, according to some embodiments of the present invention, is still implemented by the FSD function. At the mobile, RLP represents the forward-link and reverse-link user message retransmission function as well as all of the other conventional RLP functions (e.g., segmentation and reassembly of user messages; also done by the RLP function at the FSD function).

PPP represents the point-to-point protocol, which is the highest level protocol in both the FSD function and the mobile. At the mobile, PPP includes the service provider's user interface that enables the user to send and receive wireless transmissions to and from the mobile. In preferred embodiments of the present invention, the protocol stack at the mobile is identical to the mobile's protocol stack in prior-art IS-95 systems.

In communications systems of the present invention, the FSD function forwards the forward-link packets to the primary base station that is in the active set of the corresponding mobile. The forward-link RLP transmit functionality is implemented in a distributed manner between the base station (denoted BS/RLP) and the FSD function (denoted FS/RLP). The FS/RLP function divides incoming forward-link data into segments of size RLP_unit_size and assigns a unique RLP sequence number to each of the segments. The FS/RLP function then forwards the forward-link data to the BS/RLP function along with this sequence number information. Physical layer framing is done by the BS/RLP function. This framing is dependent on the rate assigned by the base station MAC layer. Since there is no soft handoff on the forward link, resources for a data burst need to be allocated at only one cell. This reduces the complexity and delays involved in setting up supplemental channels in soft handoff.

The problems described in the background section are addressed in the present approach as follows:

1. FSD Function Server: Rather than establish an FSD function per call, which requires set up and release operations, a small number of FSD function servers is established. The FSD function initially selected for a call is not moved, even if primary transfer (i.e., changing the designation of primary cell from one base station to another) occurs.
2. Synchronization on Forward Link: Transmissions from a single leg on the forward link avoids the necessity of synchronizing transmissions from multiple cells. This eliminates the need for maintaining strict timing constraints for transmissions between the FSD function and the base stations, as is the case in the prior art. Delays that result from establishing forward-direction synchronization are avoided.
3. Synchronization on Reverse Link: Unlike voice, where time of arrival is used for frame selection, RLP sequence numbers are used for packet data applications. Since the data users can tolerate more jitter, this eliminates the need for synchronization on the reverse link. Also, since the RLP function provides the equivalent functionality of frame selection by dropping duplicate messages, the frame selection function can be eliminated on the reverse link.
4. FSD function transmissions to the base stations do not need to be synchronized since there is no soft handoff on the forward link and also since data users, unlike voice users, can tolerate larger jitter.
5. Those mobiles that are not currently in the active data transmission mode are kept in the suspended state, and the RLP state information, mobile capability, service option, and current active set information for the forward and reverse links are maintained. A sub-state called the suspended (tracking) state is defined wherein the mobility of the user is tracked and the current active set information is updated. This minimizes the set-up delays when the user comes back into the active state. These procedures eliminate the RLP synchronization overhead for frequently active mobiles.
6. The segmentation functionality is separated from the RLP function. This eliminates the FS/RLP synchronization requirement imposed in the prior-art circuit-oriented architecture and the corresponding delays in setting up the supplemental channels.

To support the above architecture, communications systems of the present invention are provided with the following elements:

(a) Flow control between the base station and the FSD function to prevent the base station buffers from overflowing.
(b) Different priority queues used at the base station for (i) signaling, (ii) retransmission of old RLP data, and (iii) transmission of new RLP data.
(c) Mechanisms that efficiently transfer control from one leg to another in case the mobile receives a much stronger pilot signal from a base station that is not currently the primary.
(d) New ROLPC mechanisms since the prior-art ROLPC function is based on an architecture that maintains synchronism across different legs, so user messages from multiple call legs arrive simultaneously at the FSD function. In embodiments of the present invention, the base station stamps the current GPS (global positioning system) time on each reverse frame received. The timestamps on frames received from multiple legs are then used in deciding on frame erasures and updating the ROLPC set point.
(e) A new packet-mode FSD function that keeps a record for each of the mobiles in either an active or suspended state with the following information:
Mobile registration number—a number that uniquely identifies the mobile;
Addresses of RLP and IWF functions;
ROLPC state;
Addresses of the call legs; and
Active set—identification of those base stations currently operating in soft handoff with the mobile.

The following describes the architecture of a wireless communications system, according to one embodiment of the present invention:

Packet Registration: At packet data registration (e.g., when the mobile user turns on the mobile, or when the mobile enters a new base station coverage area while in the idle state), the IWF function selects a registration number (reg_ID) that is unique within the IWF function. Associated with the reg_ID is the following information about the registration: the IWF function, the FS/RLP server, last RLP sequence number used, and mobile capability (e.g., maximum transmission rate, etc.). At the IWF function, the reg_ID maps to an FS/RLP instance. An "instance" of a software functionality is a specific copy of the software, which executes on a computer and is configured to provide service. At the FSD function instance, the reg_ID is mapped to the current active set, the current primary leg, base station addresses, the RLP function, and the ROLPC instance. At the base stations, reg_ID maps to the address of the FSD function instance.

RLP function at FSD Function Server: When the FSD function is initially set up with a new reg_ID, it sets up an instance of the RLP function to serve the call. The RLP function provides the equivalent of frame selection functionality for data segments.

Frame Selection for Signaling Handled at Primary Cell: Signaling messages (e.g., pilot strength measurement messages (PSMMs), supplemental channel requests messages (SCRMs)), except for RLP negative acknowledgments (NAKs), received on the reverse link on all legs by the FSD function are echoed to the primary cell, as is done in the prior art. RLP NAKs are handled by the RLP function at the FSD function.

Active State (with DCCH): To minimize reactivation delay, the mobile can come out of the suspended state and transmit on a dedicated control channel (DCCH) with minimal setup and delay, and remain on the DCCH for a period of time even if there is no data traffic.

Radio Link Protocol

The radio link protocol (RLP) function for the CDMA packet data service of the present invention satisfies the following conditions:

RLP framing, sequence numbering, and recovery do not depend on the physical layer frame sizes and data rates on the air interface.

The RLP function requires no initialization when a mobile is reactivated from the suspended state. The reg_ID is remembered during the suspended state and the RLP function is not aware of whether the mobile is active or suspended. When the RLP function gets forward-link data for the mobile, it sends the data to the primary leg. In addition the RLP function is always ready to receive packets from any of the active legs.

These conditions are achieved by dividing the RLP function in the forward direction into two pieces. The retransmission function is handled at the FS/RLP function. The physical layer framing, CRC, channel encoding, multiplexing of multiple streams, and possibly encryption functions, as well as scheduling and determination of transmission rate, are handled at the base station RLP function.

The RLP data unit size (RLP_unit_size) is chosen to be a small integer number L of octets (i.e., 8-bit bytes). L=1 is desirable since a larger data unit size can result in less efficient packing on the air interface, but L=4 or 8 octets may be chosen to minimize sequence number overhead. Each RLP data unit is assigned a 20-bit sequence number. The full sequence number is used on the back haul link and when transmitting on the air interface at the higher data rates. At low data rates on the air interface, since the sequence numbers advance slowly, the lower order 16 bits of the sequence number are used. When there is ambiguity, retransmissions are used to carry the full sequence number.

An RLP segment comprises a number of RLP data units with consecutive sequence numbers. The RLP segment is identified by the sequence number of the first data unit and the length (in number of in-sequence data units).

RLP control frames identify ranges of sequence numbers that are being NAK-ed (or acknowledged (ACK-ed) if the RLP function is defined by standards also provides positive acknowledgments). Retransmitted RLP data segments are generated by the RLP function in response to NAKs. The RLP function has a mechanism to catch loss of trailing new data. A poll is used to inform the BS/RLP function of the final sequence number sent, for which the BS/RLP function may provide a positive ACK to the FS/RLP function.

New data segments and data segments to be retransmitted are forwarded by the FS/RLP function to the primary leg on the back haul link. In the reverse-link, data segments are received at the FS/RLP function from multiple legs in the active set.

MAC: Resegmentation and Physical Layer Framing

The MAC function (i.e., BS/RLP) implemented at the base station maintains separate queues for retransmitted data (SAP 1) and new data (SAP 0) and gives priority to retransmitted segments. The base station may be able to check if it has duplicate retransmitted segments queued up for transmission in SAP 1. In that case, the base station would discard the later copy.

RLP data segments are transmitted over the air interface either on the SCH or on the DCCH, where the DCCH may be used to send signaling or small amounts of user data to the mobile. It is assumed that RLP data segments are not sent simultaneously on the SCH and the DCCH. RLP control frames (i.e., NAKs) and MAC and physical layer messages (e.g. pilot strength measurement messages (PSMMs), extended handoff direction message (EHDMs), supplemental channel assignment message (SCAMs) from base station, supplemental channel request message (SCRMs) from mobile) are handled on the DCCH and are never multiplexed on a physical layer frame with user data. Messages sent on the DCCH may be transmitted at the same time that RLP data segments are transmitted on the SCH.

For operation across multiple air interface rates, the physical layer framing structure allows multiplexing of new data (which is always in sequence) and multiple retransmitted RLP segments. For new data, the sequence number identifying the first RLP data unit is used since the rest of the data is in sequence. For retransmissions, an air interface frame format identifies a sequence number and an 8-bit length indicator for each retransmitted segment. Multiple retransmitted segments and up to one new data segment are accommodated in the air interface frame using this format.

Encryption should be done in such a way that RLP sequencing is transparent to the cell. Possibilities include encryption at the cell or encryption above the RLP function. Encryption and compression above the RLP function can be done at the IWF function.

A 16-bit CRC is computed over the entire physical layer frame.

Back Haul Link Protocol

The back haul link (BHL) protocol provides framing of RLP segments between the FS/RLP function and the base station. RLP sequence numbers are used to identify the segments and only one in-sequence segment is included in one BHL frame. Depending on the maximum segment size on the BHL, the air interface physical layer frame may be segmented into multiple BHL frames.

The RLP segment sequence number, message length, and address are the only header fields required in the forward-link direction. Additional header fields are defined for the ROLPC function for use only in the reverse-link direction, including GPS time when used as a secondary sequence number, an erasure field, and a frame rate field.

The BHL protocol provides per-mobile flow control and recovery in the forward direction. A range of flow control options is possible: from a simple receiver ready/receiver not ready (RR/RNR) mechanism to a full-fledged leaky-bucket flow control. Tight flow controls are required if the system is to provide any quality-of-service (QoS) guarantees, but since the RLP function can provide no back pressure, the flow control at the base station is useful only to avoid congestion on the back haul link.

Since retransmitted segments have higher priority, retransmissions are provided with a separate flow control window.

BHL recovery with a sequence number roll-back (Go Back N) mechanism is defined. This provides recovery from buffer overflows as well as a mechanism to switch to a new primary leg. If the RLP function resynchronizes, it informs the base station to clear the buffers. New data in the new data buffer at the base station can be salvaged by using the roll-back to a common sequence number.

To minimize delays for reactivation and primary leg transfer, a separate address is provided for signaling on the BHL. In addition, the BHL at the FSD function provides a base station relay function for:

Echoing of air interface reverse-link signaling messages from secondary legs to the primary.
   Routing of inter-base station messages for reverse-link burst admission control.
   Routing of inter-base station messages for active set management.
   Routing of primary transfer messages.

Depending on the implementation, the back haul facilities of the present invention may correspond to air links between the FSD function and the base stations, rather than physical cables, such as T1 lines.

Reverse Outer Loop Power Control

Timing requirements on the back haul are simplified by implementing a reverse outer loop power control (ROLPC) algorithm at the FSD function. The ROLPC function relies on frame rate and frame error indications from all base stations in the active set. The frame rate is determined from the good frames received from any leg (correlated through the use of GPS time as the secondary sequence number). The primary cell is always aware of when a reverse link burst is active. An errored air interface frame (i.e., an erasure) is declared if an erasure is reported to the FSD function by the primary cell and there is no good frame for that GPS time from any other leg.

An outer loop power control scheme for bursty packet data could work well for a data flow in a transaction that lasts several seconds. In the present approach, the ROLPC function is operated such that the set point is remembered during the active state for the duration of a flow. The set point expires if no reverse-link data is received for a timeout period whose value is set, for example, to several seconds.

Normal Data Flow Operations on the Back Haul

Cell Reverse Link: If the air interface frame is received correctly, the base station formats one or more BHL frames and sends them to the FSD function. The header includes frame rate, the RLP segment sequence number, and the GPS time as the secondary sequence number. If the air interface frame is segmented into multiple BHL segments, the same GPS secondary sequence number is used for each segment. A "more" bit may be used in the BHL header to indicate the existence of an additional segment. If the air interface frame is received in error at the primary cell, a BHL frame is transmitted to the FSD function with the header indicating erasure and including the GPS time as the secondary sequence number.

FSD Function Reverse Link: All non-errored received segments are passed to the RLP function. The RLP function discards any duplicate octets received. Frame rate, erasure, and the secondary sequence number (GPS time) are passed to the ROLPC function.

FSD Function Forward Link: The FSD function forwards RLP segments only to the primary base station, subject to flow control. If the current primary leg base station requests recovery with a roll-back sequence number, data beginning with the roll-back sequence number is forwarded again.

Cell Forward Link: RLP segments corresponding to new data and retransmitted data that are received from the FSD function are transferred to the new data and retransmitted data buffers, respectively. The RLP sequence numbers associated with the received segments are remembered. For transmission on the air interface, one or multiple segments along with segment sequence numbers are included in the physical layer frame.

Operational Scenarios—Reactivation, Soft Handoff, and Primary Transfer

Figure 5A:
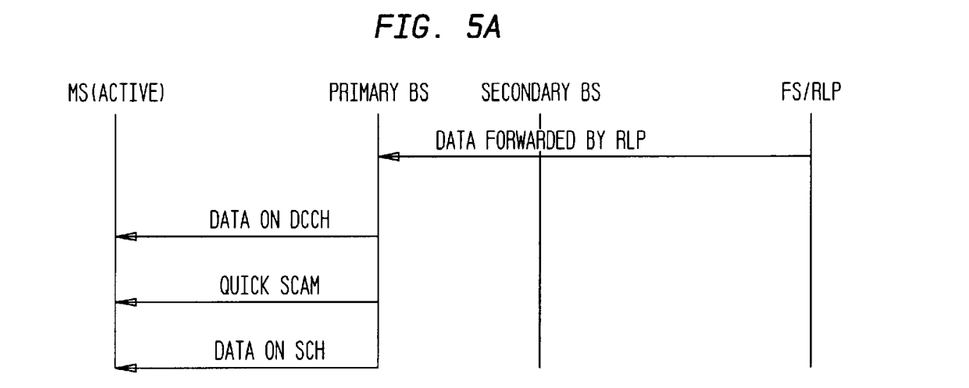
FIGS. 5A–B show representations of forward-link data transfer scenarios for mobiles in active and suspended states, respectively.
Figure 5B:
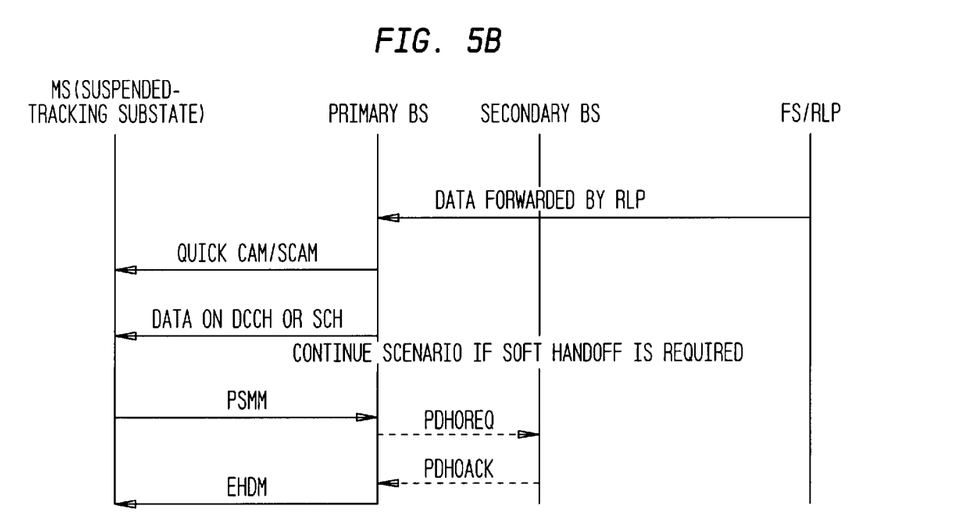

FIGS. 5A–B show representations of forward-link data transfer scenarios for mobiles in active and suspended states, respectively, where time flows from top to bottom in the figures. In the active state of FIG. 5A, data is forwarded by the FS/RLP function only to the primary base station and data transfer can begin on the DCCH with no delay. Following the assignment of a supplemental channel and the sending of a quick (i.e., less than 20 msec taken to transmit the message over the air interface) supplemental channel assignment message (SCAM) to inform the mobile of the SCH assignment, the primary base station can begin transfer of user data on the supplemental channel. In the suspended (tracking) state of FIG. 5B, the FSD function is assumed to know the primary leg to which it forwards new data. The primary base station assigns a DCCH or a SCH as appropriate and sends the channel assignment to the mobile (using a corresponding CAM or SCAM message), before beginning to transmit data on that assigned channel. Reactivation delay on the network is the time taken at the primary base station to make a channel assignment and send out the message followed by data on the dedicated channel. The reactivation delay can be less than 30 ms.

When the reverse link is in soft handoff, the processing continues with the scenario shown at the bottom of FIG. 5B. In particular, the mobile transmits a pilot strength measurement message (PSMM), which causes the primary to transmit a packet data handoff request (PDHOREQ) message to the new base station being added to the reverse-link active set (i.e., the new secondary base station). In FIG. 5B, the broken arrows signify that, in some implementations, the messages are actually transmitted via the FSD function. In other implementations, base stations may be able to communicate directly with one another without having to go through a centralized FSD function: In response, the new secondary base station transmits a packet data handoff acknowledgment (PDHOACK) message to the primary base station, which then transmits an extended handoff direction message (EHDM) message back to the mobile. To minimize the reactivation delay, data transfer on the forward link can begin before the new secondary leg is added on the reverse link. To achieve a sufficiently high probability of receiving the PSMM at the primary base station, the mobile may need to use a high power and/or repeat the transmission of the PSMM.

Figure 6:
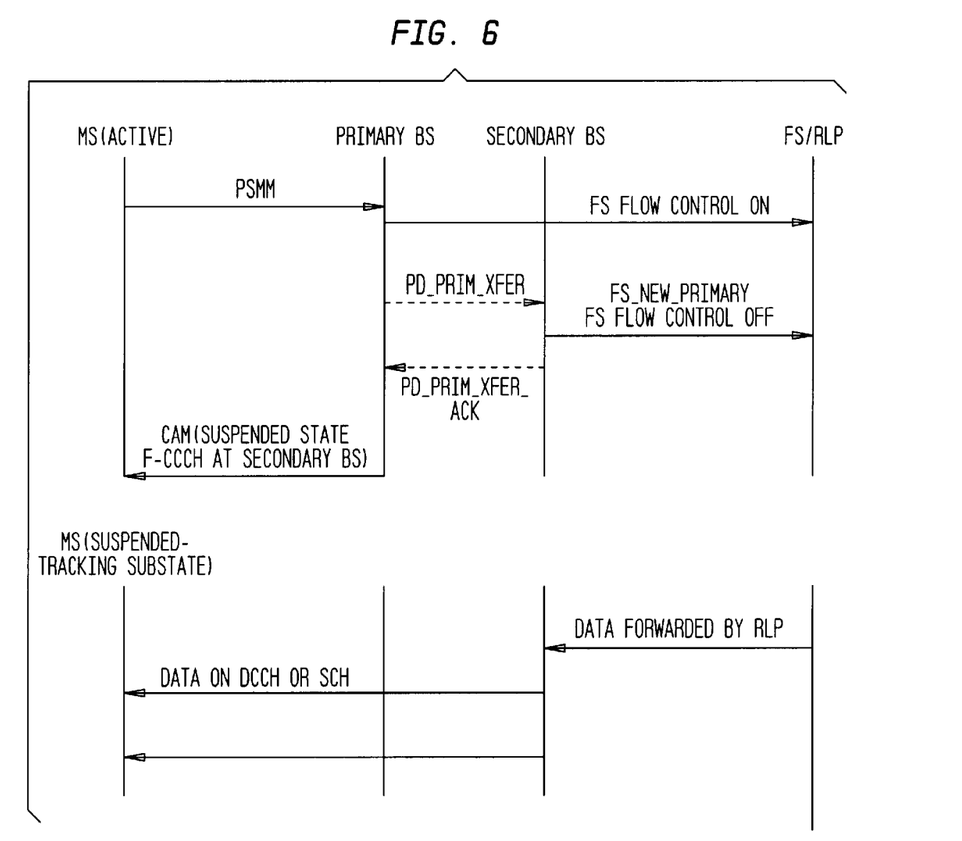
FIG. 6 shows a representation of a forward-link primary transfer scenario.

FIG. 6 shows a representation of a forward-link primary transfer scenario. Primary transfer begins when the mobile uses a PSMM message to report to the primary leg that another (i.e., a secondary) leg has the strongest pilot signal by some margin. The old primary sends a flow control ON message to the FSD function (to prevent the FS/RLP function from sending new data to the primary during the primary transfer operation) and sends a primary transfer message (PD_PRIM_XFER) to the new primary. The PD_PRIM_XFER message contains the reg ID and the reverse-link current active set for the mobile. The new primary then sends messages informing the FS/RLP function of its status as the new primary (FS_NEW_PRIMARY) and instructing the FS/RLP function to turn flow control OFF (so any new data is now sent to the new primary by the FS/RLP function). In addition, the old primary sends a CAM message to the mobile to instruct the mobile to transfer its operations into the suspended (tracking) state, listening on the forward common control channel (F-CCCH) for transmissions from the new primary. The mobile will then remain in the suspended (tracking) state, until new data is forwarded by the FS/RLP function to the new primary, at which time the new primary will assign an appropriate channel, inform the mobile of the channel assignment via a quick CAM/SCAM message, and begin data transfer on that assigned channel.

If a forward burst is in progress when the old primary receives the PSMM message from the mobile, the old primary may continue the burst until it ends or terminate the burst and have it restart at the new primary. This is accomplished as follows. The old primary includes the RLP segment sequence number at the head of the new data queue (i.e., the roll-back sequence number) in the PD_PRIM_XFER message sent to the FS/RLP function. Data left in the retransmission queue, as well as any data in the new data queue, at the old primary leg is assumed to be discarded. The retransmission queue should be small since retransmissions have priority. The old primary informs the mobile that the current burst is terminated and instructs the mobile to transfer to the suspended (tracking) state, listening to the forward common control channel (F-CCCH) for the new primary. The new primary sends a new primary message (FS_NEW_PRIMARY) to the FSD function, indicating its address and the roll-back sequence number, and turning flow control OFF. The FSD function sends all new data starting from the roll-back sequence number to the new primary leg. The new primary, when it discovers the backlog, performs a quick CAM or quick SCAM to re-start the burst to the mobile.

Primary transfer involves handling a small number of messages at the base station and on the back haul. The delays should be less than 20 ms. In addition, new data is forwarded to the new primary. The first kilobyte of data can arrive in less than 10 ms. The primary transfer delay after the receipt of the PSMM can be achieved in the range of 30–50 ms.

Figure 7:
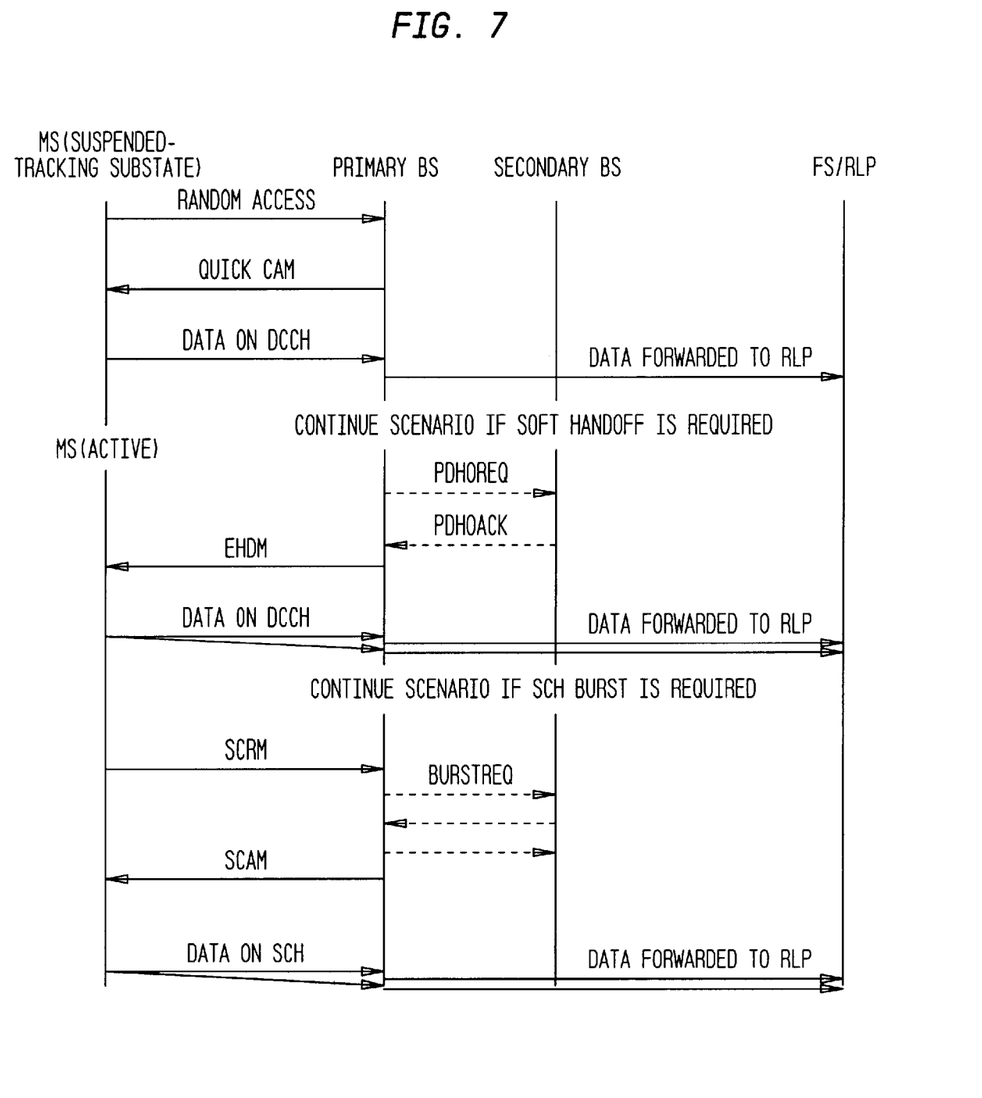
FIG. 7 shows a representation of reverse-link scenarios.

FIG. 7 shows a representation of reverse-link scenarios. A mobile in the suspended (tracking) state makes an access on the random access channel (RACH) at the primary. The primary makes an immediate channel assignment (CAM) so that data can start flowing on the DCCH and the mobile can move into the active state. Notice that data transfer after reactivation can occur prior to soft handoff set-up. The reactivation delay following receipt of the message on the RACH is less than 30 ms, including frame timing delays on the air interface.

If, based on the initial random access request, or later in the active state, the mobile is required to have additional legs in soft handoff on the reverse link, an inter-base station handoff request/grant scenario occurs. For adding a leg, the primary sends a PDHOREQ proprietary message to the new secondary, including: the reg_ID, the FSD function address, the ROLPC set point, mobile pseudo-noise (PN) code, and, if a burst is in progress, the burst end time and burst rate. The new secondary base station can then join by simply sending the received reverse-link frame onto the BHL. The secondary base station acknowledges the handoff request by setting up a reverse-link inner loop power control stream for the mobile and provides the information in the PDHOACK message to the primary, which then provides this information to the mobile in the extended handoff direction message (EHDM). In the PDHOACK message, the secondary base station may require the termination of a burst in progress. Initialization on the BHL between the secondary base station and the FSD function is only needed to obtain future updates to the ROLPC set point; hence, there is no critical timing requirement. When a leg drops from the call (when instructed by the primary), it simply stops sending reverse frames to the FSD function. A simple FSD function disconnect procedure is used, which is not time-critical.

Finally, in FIG. 7, a burst acceptance scenario is shown. The request/grant scenario on the back haul is handled by the active set base stations. The burst request/grant procedure involves processing of four messages at the base stations and transport of three messages on the back haul. The total burst grant delay after the receipt of the SCRM to the transmission of the SCAM can be made less than 50 ms.

Power Control

Prior-art IS-95 standards assume that the active sets (i.e., those base stations currently communicating with a particular mobile unit) for both forward and reverse links are the same. That is, traffic and control channels are set up symmetrically. This implies that a dedicated traffic channel on the reverse link will have an associated dedicated power control channel in the forward link to control the mobile unit's transmit power level.

In the prior-art cdma2000 standard, the reverse-link transmit power is controlled by the forward-link power control sub-channel if it is present. During the active state, the power control sub-channel is multiplexed (i.e., punctured) either on the forward dedicated control channel (F-DCCH) or on the forward fundamental channel (F-FCH). This requires a symmetric active set to be maintained by the forward link and the reverse link, as shown in FIG. 3. In other words, if the reverse link is in soft handoff, then the forward link has to be in the soft handoff even if it is not otherwise needed.

The presence of high-speed data users presents unique challenges in system design due to the asymmetric nature of traffic. For efficient operation of packet mode services, it is desirable to have asymmetric support for the forward and reverse active sets. The prior-art IS-95 standards do not provide power control support for this mode of operation.

The present approach addresses the issue of power control feedback when the forward and reverse links have different active sets. For example, the forward link may be in one-way connection (i.e., simplex mode), or may not be connected at all, while the reverse link may be in two-way connection (soft handoff).

In order to serve non-symmetric active set operation, the present approach involves a decoupling of the power control sub-channel from both the F-DCCH and the F-FCH and instead using the common power control channel (PCCH) to control the reverse-link power when the mobile is in the active state. As defined in the prior-art cdma2000 standard, the forward-link common power control channel (F-PCCH) is a set of power control sub-channels time multiplexed on a single physical channel. Under the cdma2000 standard, each power control sub-channel on the F-PCCH controls the reverse-link enhanced access channel (R-EACH) power or the reverse-link common control channel (R-CCCH) power for a different mobile serviced by the base station transmitting the F-PCCH. An R-EACH is used by a mobile in either the dormant or suspended state to request assignment of a dedicated traffic channel. Dormant and suspended states are similar in that the mobile has no dedicated air interface channels assigned. In the suspended state, some information about the mobile user data session is maintained in the base station, whereas, in the dormant state, none is. An R-CCCH may be used by a mobile in the dormant state to send a relatively short burst of data, without having to request and be assigned a dedicated traffic channel.

The prior-art cdma2000 standard does not allow the F-PCCH to control the reverse-link dedicated control channel (R-DCCH) power or the reverse-link traffic channel (R-FCH or R-SCH) power. The present approach removes this restriction so that the F-PCCH can control the reverse-link transmit power while a mobile is in the active state. This approach provides power control at the mobile unit when the forward link and the reverse link have different active sets.

Figure 8:
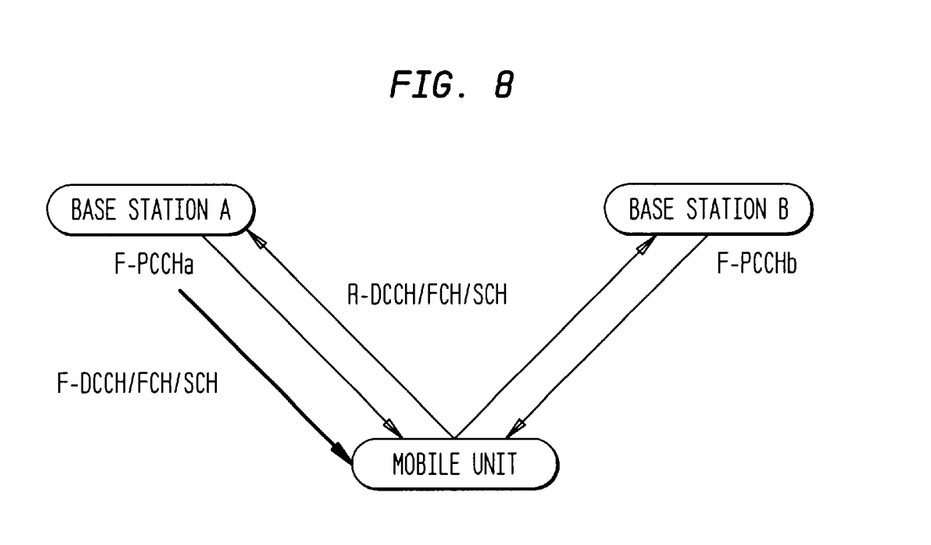
FIG. 8 shows a representation of an example where the forward link is in simplex (one-way connection) and the reverse link is in two-way soft handoff.

FIG. 8 shows a representation of an example where the forward link is in simplex (one-way connection) and the reverse link is in two-way soft handoff. On the forward link, base station A has an F-FCH or an F-DCCH active. On the reverse link, the mobile unit is in soft handoff with base stations A and B. The mobile's transmit power is controlled by both base stations via the common power control channels F-PCCHa and F-PCCHb, respectively. There is no power control sub-channel punctured on the F-FCH or on the F-DCCH transmitted by base station A. Alternatively, the power control sub-channel from base station A could be punctured on the F-FCH or F-DCCH, while base station B transmits its power control sub-channel via F-PCCHb. To extend the example of FIG. 8 further, base station A can have a supplemental channel (F-SCH) active on the forward link in addition to either the F-DCCH or F-FCH. In any case, under this approach, there is no need to establish F-DCCH or F-FCH from both base stations in order to provide power control.

Figure 9:
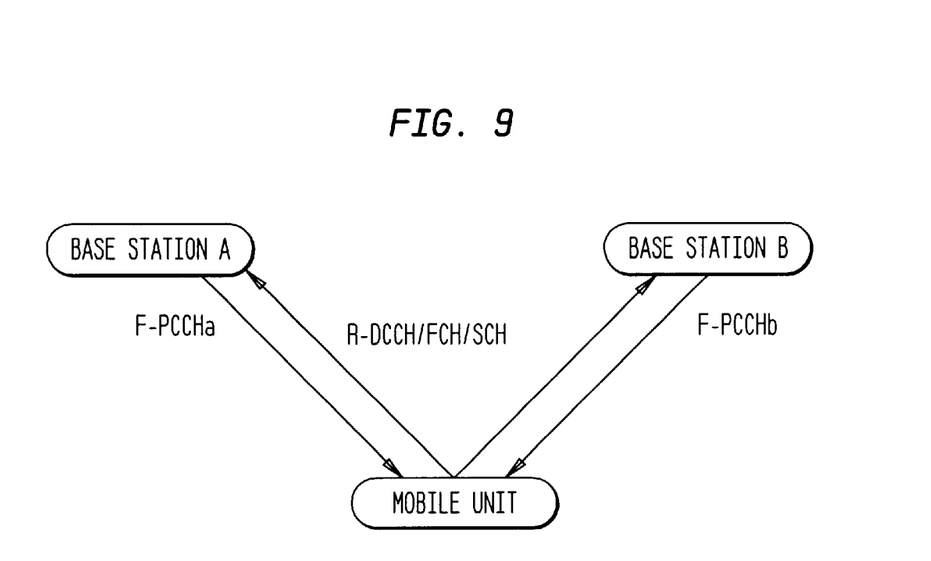
FIG. 9 shows a representation of an example where the forward link is not active at all and the reverse link is in two-way soft handoff.

FIG. 9 shows a representation of an example where the forward link is not active at all and the reverse link is in two-way soft handoff. On the forward link, there is no F-FCH or F-DCCH or F-SCH active. On the reverse link, the mobile unit is in soft handoff with both base stations A and B using an R-DCCH, R-FCH, and/or R-SCH. The mobile's transmit power is controlled by both base stations via F-PCCHa and F-PCCHb, respectively.

At its most basic, the techniques described herein eliminate nearly all delay on the back haul interface between a base station and a FSD/RLP function when reactivating a packet data user from a state where the user has been inactive for some time, and a high-speed air interface channel needs to be re-established for use by the user. Prior art uses circuit-oriented techniques and procedures on the back haul interface, in which there are many interactions between the base station and the FSD/RLP function when activating or reactivating users.

In CDMA systems according to the present invention, the network-based RLP function is divided into two parts: one that may execute at a central place in the network and one that executes in the base station. (Alternatively, both parts may execute in the base station.) The centrally located part (i.e., the part that may execute remotely from the base station) performs the functions of retransmission control. The part located in the base station performs the function of sending the user messages over the air. These functions include those of physical layer framing and re-segmentation, error detection and correction of air interface messages, channel encoding, multiplexing of multiple streams, encryption, determination of over-the-air transmission rates, and scheduling of over-the-air transmission. This separation enables the user messages to be forwarded immediately to the base station with the best opportunity to provide good communications with the mobile unit. No time synchronous coordination is required between the base station and the (possibly) remote part of RLP function, and no air interface limits are imposed on the amount of data that can be sent to the base station for a given call at a given point in time.

The centrally located part of the network-based RLP function sends user data from the network to one and only one call leg, namely the one with the best signal to the mobile user. That call leg determines how and when to transfer the user messages to the mobile unit over the air interface.

The determination of which base station has the best signal to the mobile user is performed by the base station, and the knowledge of this "primary" base station is passed to the centrally located part of the network-based RLP function. This concept may be referred to as "primary transfer for high-speed packet data services."

Two queues are kept in the primary base station to handle user messages that need to be sent over the air to the mobile user. One queue, called the "new data" queue, keeps new user messages, namely, messages that have not already been sent to the user. The other queue, called the "retransmission" queue, keeps user messages that have already been transmitted to the mobile unit, but which have not been received, or which have been received in error by the mobile unit.

Priority for over-the-air transmission is given to the user messages on the retransmission queue.

An over-the-air transmission can contain multiple user message segments from the retransmit queue, plus one message segment from the new data queue. This capability makes optimal use of the air interface capacity. The messages from the retransmission queue are packed first into the air interface frame, and have an RLP sequence number, plus a length (in units of bytes allocated to a unit of increment of the RLP sequence number). The user message segment from the new data queue contains an RLP sequence number, and continues to the end of the air interface frame.

When a primary transfer occurs, the current primary leg uses flow control on the back haul to prevent the remote part of RLP function from sending data to a call leg that is in the process of changing its status from being primary to being a secondary call leg. The current primary passes to the new primary the RLP sequence number representing all new user data still remaining in the new data queue. When the primary transfer operation is completed, the new primary call leg informs the remote part of RLP function of its address and removes the back haul flow control. In this process, the new primary also informs the remote RLP function of the sequence number with which to begin sending new user messages. Hence, the remote RLP function in effect sends to the new primary the user data that had not yet been transmitted by the old primary. This capability avoids having the old primary leg send its unsent data to the new primary, thereby saving transport time and utilization. (Such cell-to-cell transport would be required if both parts of the network-based RLP function executed in the base station. Either the primary transfer capability would not be part of the implementation, and the solution would require, in general, that cell-to-cell user data transport occur, or the primary transfer capability would be designed into the implementation, but additional interactions between cells and a frame selection/distribution function would be required to make the system work.)

Both signaling and user message transmission over the air interface in the forward direction (to the mobile unit) are performed in simplex mode, from a single call leg. Alternatively, signaling and user message transfer in the reverse direction (to the base station and FSD function) occur in general using multiple call legs in soft handoff. The power control subchannel punctured into a forward-link channel to control the mobile reverse-link transmission power needs to be decoupled from the dedicated forward link air interface channels, as described above.

The FSD function, together with the remote part of the network-based RLP function form a server application that is assigned to the high-speed packet data call when the call is first established. This server instance is not changed, regardless of whether the mobile user remains inactive for long periods of time, or whether primary transfer occurs. This server is always ready to accept data from the network to distribute to the primary leg for transmission to the mobile user, and is always ready to receive user messages from any of the soft handoff legs that are part of the call. After a first initialization, no time is required to initialize with the mobile unit, even when the user is reactivated after a long idle time duration.

Reverse-link user messages from the mobile unit can arrive at the FSD/RLP server (or function) from multiple legs at times that differ widely from one another. Any user message correctly received at any leg is accepted by the FSD function, because the RLP function discards duplicate messages.

The reverse-link user messages sent from the call legs have both an RLP sequence number and a portion of the value of the GPS time embedded within them. The RLP sequence number is used by the RLP function to detect missing or duplicate messages. The GPS time is used by the FSD function to associate one or more back haul information packets with the time of transmission of the information over the air interface. The maximum size of the back haul packet transmissions is in general different from the number of user information elements (i.e., bytes) that can fit in a 20-msec air interface frame. Hence, one air interface frame worth of user data may occupy more than one packet on the back haul facility when it is transferred to the FSD/RLP function. The air interface frame rate and quality indicators are used at the FSD function to calculate a set point value, the so-called ROLPC value, which is returned to all call legs, so they can control the power transmitted by the mobile unit.

To properly calculate the ROLPC set point value, the calculation has to determine when all legs receive the same air interface frame in error. For circuit mode services, information on the traffic-bearing air interface channel is always present, but in a high-speed packet data service, user message transmissions are bursty. The primary call leg always knows when a supplemental channel is assigned, so it can generate a back haul frame with an erasure indicator (i.e., an air interface frame was expected, but was not received, or was received in error), plus a GPS time stamp. If no other leg delivers over the back haul a correct air interface message with the same GPS time, the ROLPC calculation function at the FSD function uses an erasure for the calculation.

The protocol used on the back haul between the base station and the FSD/RLP function has separate addresses for user message transfer and for inter-base station communications, and for communication of mobile unit signaling. If the FSD function receives a back haul packet having the address used for mobile unit signaling communications, the message is forwarded to the primary base station. (The primary base station is responsible for interpreting and responding to the signaling messages from the mobile unit. These messages are received over the air interface by all legs, but need to be echoed to the primary leg in case the reception at the primary leg of the air interface transmission from the mobile is in error.) If the FSD function receives a back haul packet having the address used for inter-base station communications, it forwards the message to the call leg, or legs, specified in the message body. If the FSD function receives a back haul message having the address of user message transfer, it passes the message to its associated RLP function.

If there is an air interface channel assigned to the mobile unit for signaling (i.e., either an F-FCH, or an F-DCCH), data forwarded to the primary leg from the FSD/RLP function causes a control message to be sent to the mobile unit, containing the code point of the F-SCH that is to carry the user message. Because no coordination is needed with the primary leg before the FSD/RLP function sends the user message, the reactivation time for this forward-link transmission is minimized. When no user message exchanges are going on, the mobile continues to report its pilot strength measurements to the primary, in case another base station becomes the one with the strongest signal at the location of the mobile unit. Primary transfer occurs, if necessary, and the reactivation time to send new data to the mobile user is again minimized.

If the mobile user has data to send in the reverse direction, and the user currently has a signaling air interface channel assigned on the reverse link to the call legs, the user can either immediately begin sending the data using the R-FCH or R-DCCH (whichever is assigned), or it can send a signaling message requesting a higher rate air interface channel to be assigned. The mobile unit can continue to use the signaling channel to transfer user data until the higher speed air interface channel assignment is received by it. These mechanics minimize reactivation delay for reverse-link exchanges when the mobile has an assigned signaling air interface channel.

When the mobile unit is not active on any air interface channel, and the primary leg receives user messages from the FSD/RLP function, the primary leg uses a forward-link common signaling air interface channel to assign a F-SCH to the mobile. Transmissions to the mobile user ensue. Because there is no negotiation interactions between the primary leg and the FSD/RLP function, and no negotiation interactions among the call legs (transmissions in the forward direction are simplex, from the primary leg only), the reactivation time is minimized.

When the mobile unit is not active on any air interface channel, and the mobile user has data to send to the network, it sends a signaling message on a reverse common signaling channel, requesting the assignment of reverse air interface channels for its data transmission. Once these are assigned, the mobile can begin its data transmission, as discussed above. No synchronization is required to be performed with the FSD function, and no initializations are required. Hence, the back haul communications add no delay to the user reactivation time.

Although the present invention has been described in the context of IS-95 CDMA wireless systems, it will be understood that the present invention may be able to be implemented in CDMA wireless systems conforming to standards other than the IS-95 family of standards, e.g., the European Telecommunications Standard Institute (ETSI) family of standards. Similarly, the present invention may be able to be implemented in wireless systems other than CDMA systems such as FDMA (frequency division multiple access) or TDMA (time division multiple access) systems.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A wireless communications method, comprising the steps of:
    (a) beginning to receive, at a first base station of a wireless communications system, a reverse-link channel;
    (b) then transmitting, by the first base station, a forward-link power control signal of a power control subchannel corresponding to the reverse-link channel using a forward-link channel that 1) is decoupled from any other forward-link channel transmission by the base station for the corresponding reverse-link channel and 2) is a common power control channel of two or more base stations; and
    (c) providing, if at least one other base station transmits a forward-link power control signal for the corresponding reverse-link channel, asymmetric power control for the reverse link channel.

2. The invention of claim 1, wherein the communications system is a CDMA system.

3. The invention of claim 2, wherein the CDMA system conforms to a cdma2000 standard.

4. The invention of claim 1, wherein the one or more reverse-link channels are received from a mobile and the power control signals comprise power control bits, wherein one bit value is designed to instruct the mobile to decrease a transmit power level for the one or more reverse-link channels and another bit value is designed to instruct the mobile to increase the transmit power level for the one or more reverse-link channels.

5. The invention of claim 1, wherein the one or more reverse-link channels are received from a mobile and an active set for the forward link for the mobile is different from a corresponding active set for the reverse link for the mobile.

6. The invention of claim 5, wherein:

the first base station transmits only the decoupled forward-link channel corresponding to the mobile;

a second base station of the wireless communications system transmits one or more forward-link channels corresponding to the mobile, wherein the one or more forward-link channels comprise power control signals corresponding to the second base station;

the first and second base stations receive and process the one or more reverse-link channels transmitted by the mobile; and the power control signals transmitted by the first and second base stations are designed to instruct the mobile how to control a transmit power level for the one or more reverse-link channels.

7. The invention of claim 6, wherein the one or more forward-link channels transmitted by the second base station comprises a second decoupled forward-link channel comprising power control signals corresponding to the second base station.

8. The invention of claim 6, wherein the one or more forward-link channels transmitted by the second base station comprises a forward-link traffic channel with punctured power control signals corresponding to the second base station.

9. The invention of claim 6, wherein the second base station transmits only a second decoupled forward-link channel corresponding to the mobile and comprising power control signals corresponding to the second base station.

10. The invention of claim 6, wherein the second base station is a primary base station, the first base station is a secondary base station, and the primary and secondary base stations are operating in reverse-link soft handoff corresponding to the mobile.

11. The invention of claim 1, wherein the one or more reverse-link channels are received from a mobile and the power control signals are designed to instruct the mobile how to control a transmit power level for the one or more reverse-link channels.

12. A wireless communications system comprising a first base station configured to:

(a) begin to receive and process a reverse-link channel; and (b) then transmit, by the first base station, a forward-link power control signal of a power control sub-channel corresponding to the reverse-link channel using a forward-link channel that 1) is decoupled from any other forward-link channel transmission by the base station for the corresponding reverse-link channel and 2) is a common power control channel of two or more base stations; and (c) providing, if at least one other base station transmits a forward-link power control signal for the corresponding reverse-link channel, asymmetric power control for the reverse link channel.

13. The invention of claim 12, wherein the communications system is a CDMA system.

14. The invention of claim 13, wherein the CDMA system conforms to a cdma2000 standard.

15. The invention of claim 12, wherein the one or more reverse-link channels are received from a mobile and the power control signals comprise power control bits, wherein one bit value is designed to instruct the mobile to decrease a transmit power level for the one or more reverse-link channels and another bit value is designed to instruct the mobile to increase the transmit power level for the one or more reverse-link channels.

16. The invention of claim 12, wherein the one or more reverse-link channels are received from a mobile and an active set for the forward link for the mobile is different from a corresponding active set for the reverse link for the mobile.

17. The invention of claim 16, wherein:

the first base station transmits only the decoupled forward-link channel corresponding to the mobile;

a second base station of the wireless communications system transmits one or more forward-link channels corresponding to the mobile, wherein the one or more forward-link channels comprise power control signals corresponding to the second base station;

the first and second base stations receive and process the one or more reverse-link channels transmitted by the mobile; and the power control signals transmitted by the first and second base stations are designed to instruct the mobile how to control a transmit power level for the one or more reverse-link channels.

18. The invention of claim 17, wherein the one or more forward-link channels transmitted by the second base station comprises a second decoupled forward-link channel comprising power control signals corresponding to the second base station.

19. The invention of claim 17, wherein the one or more forward-link channels transmitted by the second base station comprises a forward-link traffic channel with punctured power control signals corresponding to the second base station.

20. The invention of claim 17, wherein the second base station transmits only a second decoupled forward-link channel corresponding to the mobile and comprising power control signals corresponding to the second base station.

21. The invention of claim 17, wherein the second base station is a primary base station, the first base station is a secondary base station, and the primary and secondary base stations are operating in reverse-link soft handoff corresponding to the mobile.

22. The invention of claim 12, wherein the one or more reverse-link channels are received from a mobile and the power control signals are designed to instruct the mobile how to control a transmit power level for the one or more reverse-link channels.

* * * * *